US008767977B2

(12) United States Patent
Fukuda et al.

(10) Patent No.: US 8,767,977 B2
(45) Date of Patent: Jul. 1, 2014

(54) ACOUSTIC CHARACTERISTIC CORRECTION COEFFICIENT CALCULATION APPARATUS, ACOUSTIC CHARACTERISTIC CORRECTION COEFFICIENT CALCULATION METHOD AND ACOUSTIC CHARACTERISTIC CORRECTION APPARATUS (75) Inventors: Takashi Fukuda, Fukaya (JP); Toshifumi Yamamoto, Hino (JP); Yasuhiro Kanishima, Mitaka (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 523 days.

(21) Appl. No.: 13/072,196

(22) Filed: Mar. 25, 2011

(65) Prior Publication Data

US 2011/0274292 A1 Nov. 10, 2011

(30) Foreign Application Priority Data

May 7, 2010 (JP) .................. 2010-107592

(51) Int. Cl.
*H03G 5/00* (2006.01)
(52) U.S. Cl.
USPC .............................. 381/98; 381/56
(58) Field of Classification Search
USPC ................. 381/96, 97, 98, 58, 59, 56; 700/94
See application file for complete search history.

(56) References Cited

U.S. PATENT DOCUMENTS

| 4,888,808 | A | | 12/1989 | Ishikawa et al. |
| 5,477,398 | A | | 12/1995 | Ichikawa et al. |
| 5,572,443 | A | | 11/1996 | Emoto et al. |
| 6,072,877 | A | * | 6/2000 | Abel ................... 381/17 |
| 6,760,451 | B1 | * | 7/2004 | Craven et al. ............ 381/98 |
| 7,593,535 | B2 | | 9/2009 | Shmunk |
| 2008/0090531 | A1 | * | 4/2008 | Jungerman et al. ......... 455/126 |
| 2008/0192957 | A1 | | 8/2008 | Kubo |
| 2009/0296949 | A1 | | 12/2009 | Iwata et al. |

FOREIGN PATENT DOCUMENTS

| JP | S63-281510 | 11/1988 |
| JP | 2723001 B2 | 11/1997 |
| JP | 2748826 B2 | 2/1998 |
| JP | 2002-366162 | 12/2002 |

(Continued)

OTHER PUBLICATIONS

Notification of Reasons for Refusal mailed by the Japan Patent Office on Jun. 7, 2011 in corresponding Japanese patent app. No. 2010-107592 in 13 pages.

(Continued)

*Primary Examiner* — Duc Nguyen
*Assistant Examiner* — Phan Le
(74) *Attorney, Agent, or Firm* — Knobbe, Martens, Olson & Bear, LLP (57) ABSTRACT

According to one embodiment, an acoustic characteristic correction coefficient calculation apparatus includes a frequency converter, a smoother, a frequency inverter, a cutter, and a calculator. The frequency converter is configured to convert a first impulse response corresponding to an input acoustic signal to a frequency domain. The smoother is configured to smooth amplitude and phase corresponding to the frequency domain converted by the frequency converter. The frequency inverter is configured to convert a frequency characteristic smoothed by the smoother to a time domain. The cutter is configured to cut out a second impulse response configured by the time domain obtained by converting the frequency characteristic by use of the frequency inverter by a preset tap number. The calculator is configured to calculate a correction coefficient used to correct an acoustic characteristic based on a result cut out by the cutter.

9 Claims, 9 Drawing Sheets

(56) References Cited

FOREIGN PATENT DOCUMENTS

| | | |
|---|---|---|
| JP | 2003-168958 | 6/2003 |
| JP | 2008-197284 | 8/2008 |
| JP | 2009-288555 | 12/2009 |
| JP | 2009-545914 | 12/2009 |
| WO | WO 2008/016531 | 2/2008 |

OTHER PUBLICATIONS

Notification of Reasons for Refusal mailed by the Japan Patent Office on Aug. 23, 2011 in corresponding Japanese patent app. No. 2010-107592 in 4 pages.

Explanation of Non-English Language References, Dec. 10, 2009.

* cited by examiner

ACOUSTIC CHARACTERISTIC CORRECTION COEFFICIENT CALCULATION APPARATUS, ACOUSTIC CHARACTERISTIC CORRECTION COEFFICIENT CALCULATION METHOD AND ACOUSTIC CHARACTERISTIC CORRECTION APPARATUS

CROSS-REFERENCE TO RELATED APPLICATIONS

This application is based upon and claims the benefit of priority from Japanese Patent Application No. 2010-107592, filed May 7, 2010, the entire contents of which are incorporated herein by reference.

FIELD

Embodiments described herein relate generally to an acoustic characteristic correction coefficient calculation apparatus, acoustic characteristic correction coefficient calculation method and acoustic characteristic correction apparatus.

BACKGROUND

A technique for calculating an acoustic characteristic correction coefficient based on an impulse response is known. For example, a sound wave corresponding to an acoustic characteristic measurement signal (impulse, TSP or white noise) is output by use of a to-be-measured acoustic output unit and the sound wave is input by use of an acoustic input unit of an acoustic characteristic correction coefficient calculation apparatus and converted to an electrical signal. A transfer function corresponding to a portion ranging from the to-be-measured acoustic output unit to the acoustic output unit of the acoustic characteristic correction coefficient calculation apparatus is calculated. Then, an inverse transfer function of the transfer function is calculated and an impulse response corresponding to the inverse transfer function is acquired. Further, the impulse response is cut out by a preset tap number and an acoustic characteristic correction coefficient can be calculated. For example, a correction filter utilizing the above calculated acoustic characteristic correction coefficient is applied to an acoustic apparatus to improve the sound quality of the acoustic apparatus.

It is known that it takes certain time for the thus acquired impulse response to be sufficiently converged. If the impulse response is cut out by the limited preset tap number, the cutout result may correspond to an impulse response that is not sufficiently converged. An acoustic characteristic correction coefficient calculated based on the cutout result corresponding to the impulse response that is not sufficiently converged may not be an adequate correction coefficient in some cases.

BRIEF DESCRIPTION OF THE DRAWINGS

A general architecture that implements the various feature of the embodiments will now be described with reference to the drawings. The drawings and the associated descriptions are provided to illustrate the embodiments and not to limit the scope of the invention.

DETAILED DESCRIPTION

Various embodiments will be described hereinafter with reference to the accompanying drawings.

In general, according to one embodiment, an acoustic characteristic correction coefficient calculation apparatus includes a frequency converter, a smoother, a frequency inverter, a cutter, and a calculator. The frequency converter is configured to convert a first impulse response corresponding to an input acoustic signal to a frequency domain. The smoother is configured to smooth amplitude and phase corresponding to the frequency domain converted by the frequency converter. The frequency inverter is configured to convert a frequency characteristic smoothed by the smoother to a time domain. The cutter is configured to cut out a second impulse response configured by the time domain obtained by converting the frequency characteristic by use of the frequency inverter by a preset tap number. The calculator is configured to calculate a correction coefficient used to correct an acoustic characteristic based on a result cut out by the cutter.

First Embodiment

Figure 1:
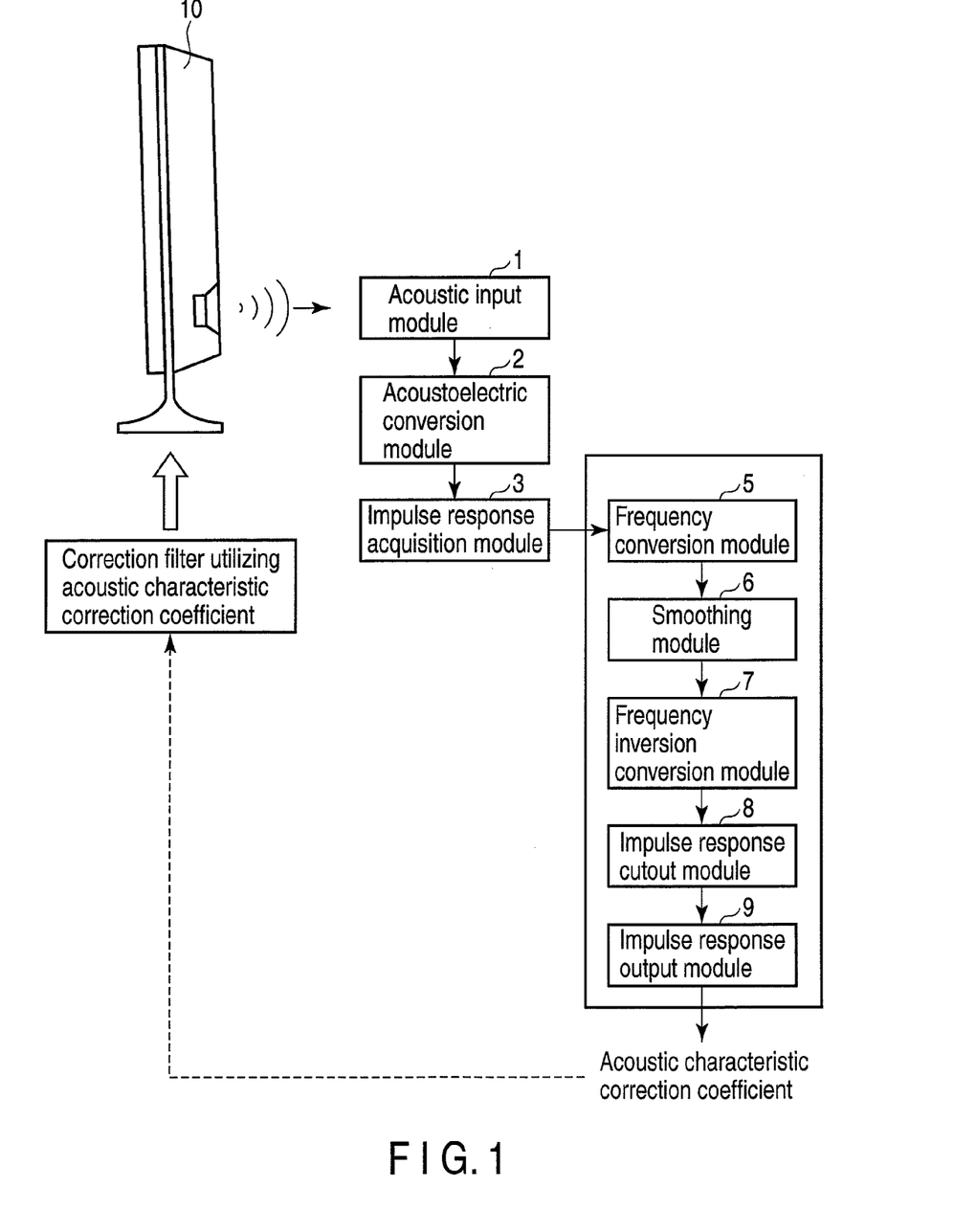
FIG. 1 is a block diagram showing one example of an acoustic characteristic correction coefficient calculation system of a first embodiment.

FIG. 1 is a block diagram showing one example of an acoustic characteristic correction coefficient calculation system of a first embodiment. As shown in FIG. 1, for example, the acoustic characteristic correction coefficient calculation system includes an acoustic input module 1, acoustoelectric conversion module 2, impulse response acquisition module 3, frequency conversion module 5, smoothing module 6, frequency inverse conversion module 7, impulse response cutout module 8 and impulse response output module 9.

Figure 2:
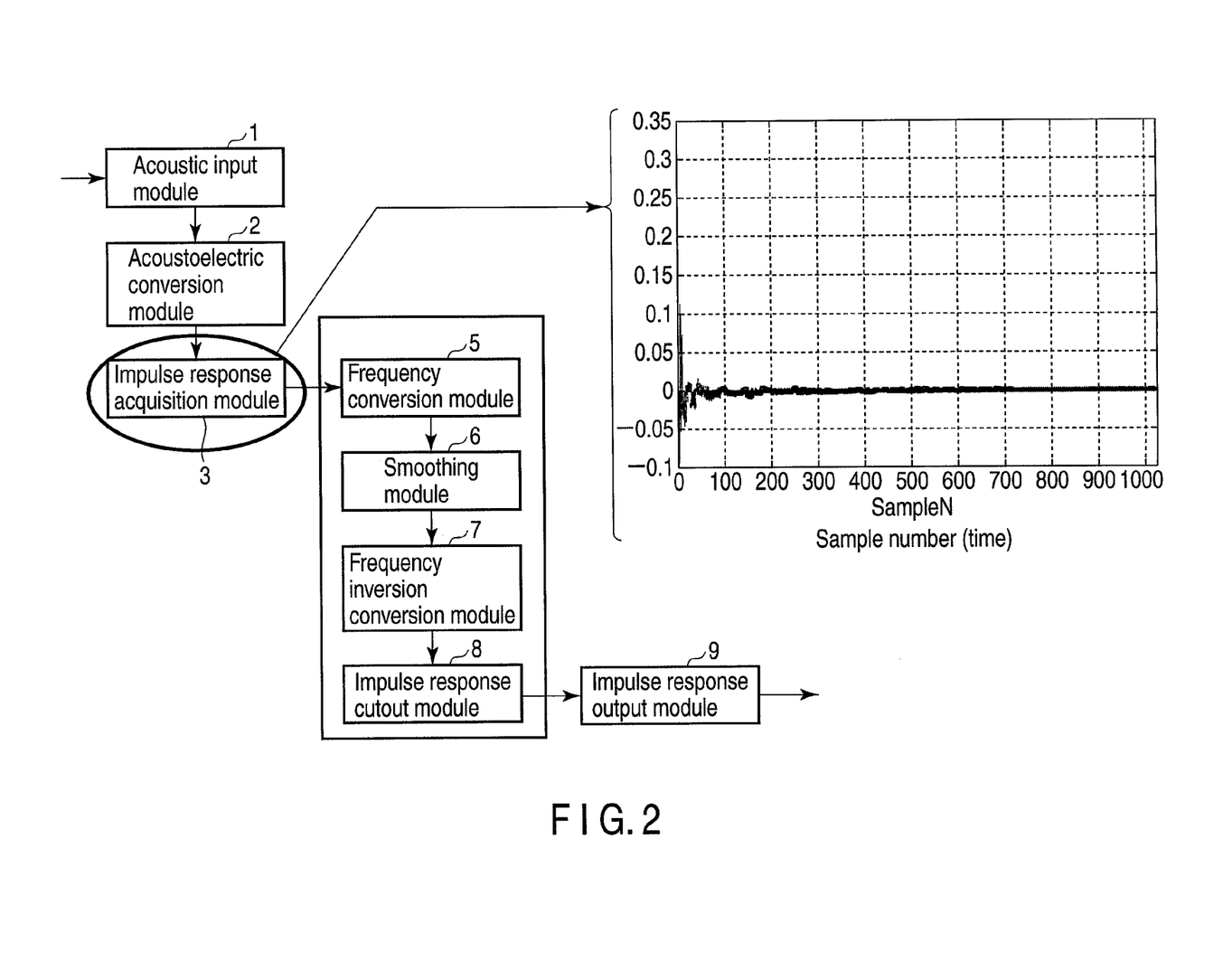
FIG. 2 is a diagram showing one example of an impulse response acquired by use of an impulse response acquisition module.

The acoustic input module (acoustic input unit) 1 inputs an acoustic characteristic measurement signal such as a time-stretched pulse (TSP) output from the speaker (to-be-measured acoustic output unit) of an acoustic apparatus 10 such as a digital TV. The acoustoelectric conversion module (acoustic input conversion unit) 2 converts an input acoustic characteristic measurement signal to an electrical signal. The impulse response acquisition module 3 derives a transfer function of a portion ranging from the speaker to the acoustoelectric conversion module 2 and acquires an impulse response corresponding to a target characteristic based on the transfer function. Alternatively, the impulse response acquisition module 3 calculates an inverse transfer function of the above transfer function and acquires an impulse response corresponding to a target characteristic based on the calculation result of the inverse transfer function. FIG. 2 is a diagram showing one example of an impulse response acquired by the impulse response acquisition module 3. The impulse response shown in FIG. 2 is an impulse response before the smoothing process in the succeeding stage.

Figure 3:
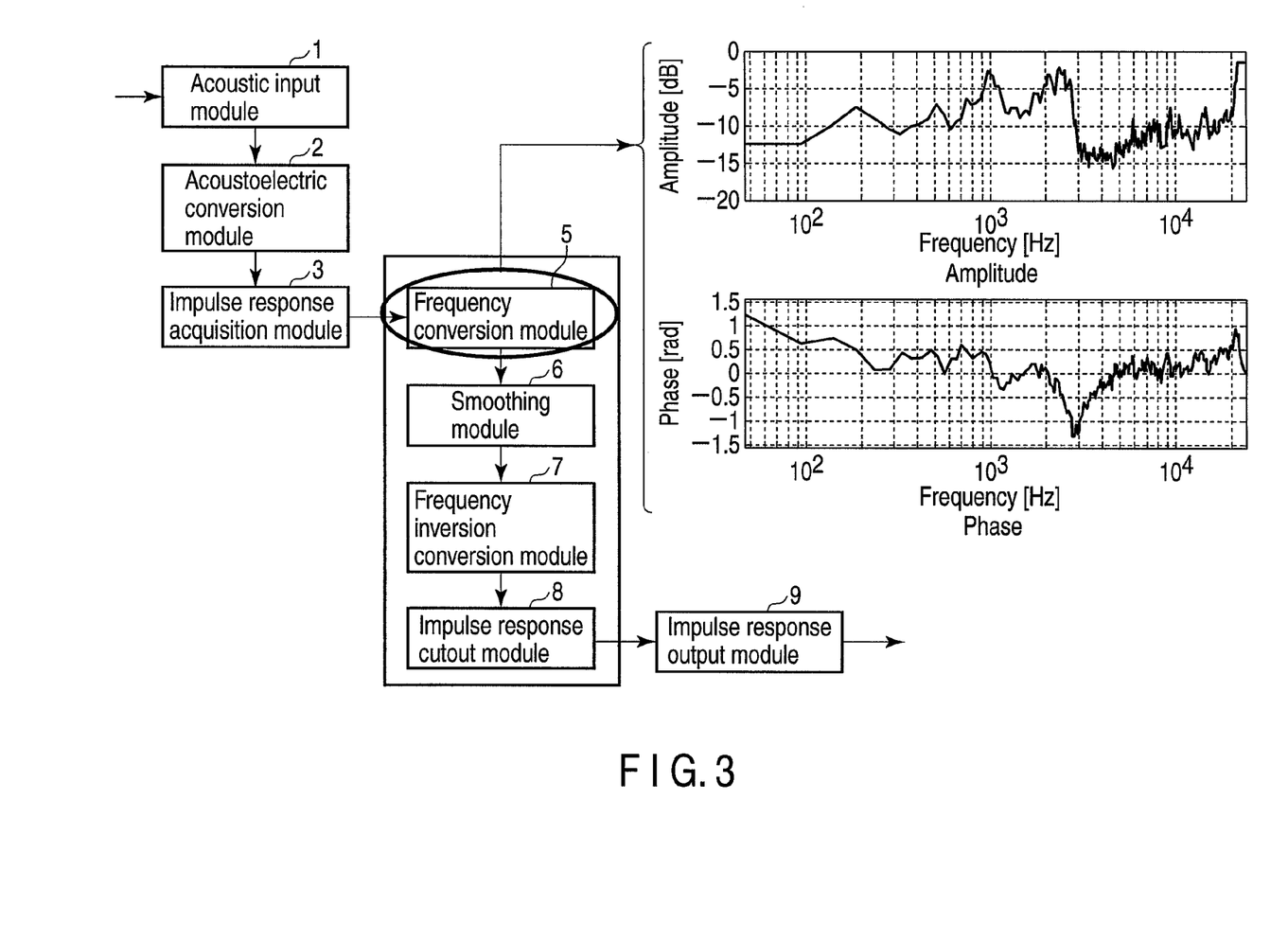
FIG. 3 is a diagram showing one example of analysis of a frequency characteristic of the impulse response.
Figure 4:
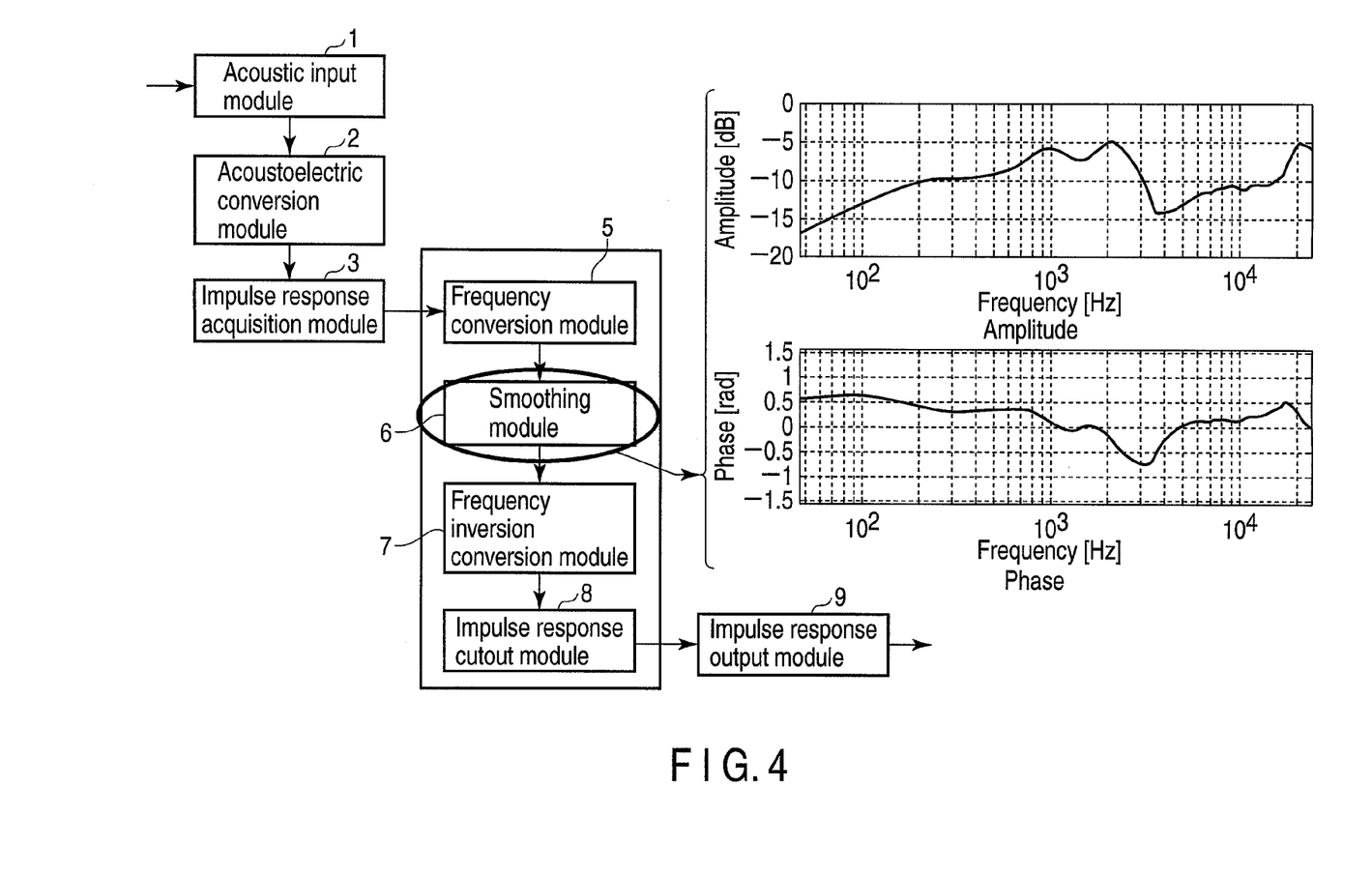
FIG. 4 is a diagram showing one example of the result of a process of smoothing the amplitude and phase in a converted frequency domain.

The frequency conversion module 5 converts the acquired impulse response to a frequency domain. FIG. 3 is a diagram showing one example of analysis of a frequency characteristic of the acquired impulse response. The smoothing module 6 smoothes the amplitude and phase corresponding to the thus converted frequency domain. FIG. 4 is a diagram showing one example of the result of a process of smoothing the amplitude and phase in the converted frequency domain.

The smoothing module 6 makes equal the amplitudes and phases in a preset frequency band having an object frequency (that is hereinafter referred to as a first frequency) set at the center in the respective sampled frequencies. For example, the smoothing module 6 uses values obtained by making equal the amplitudes and phases in a frequency band ranging from a frequency (second frequency) derived by dividing the first frequency by a ratio set by the user to a frequency (third frequency) derived by multiplying the first frequency by the same ratio as the amplitude and phase of the first frequency. Thus, the smoothing module 6 makes equal the amplitudes and phases in the respective frequencies and the smoothing result of the amplitudes and phases as shown in FIG. 4 can be acquired. FIG. 4 shows the frequency characteristic when the ratio is set at 1/12 of an octave.

Figure 5:
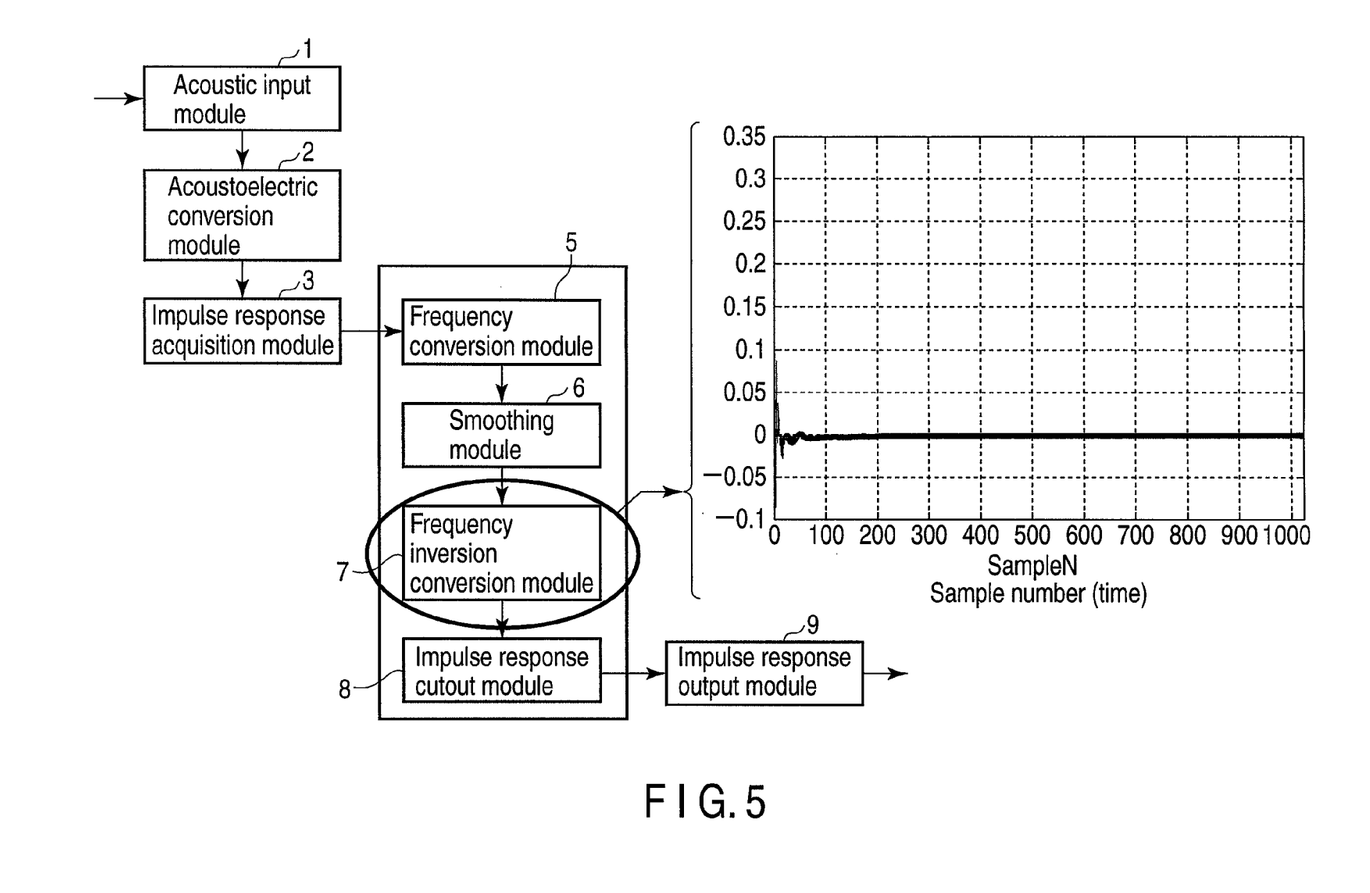
FIG. 5 is a diagram showing one example of the result of a process of returning the smoothed frequency characteristic to an impulse response by frequency inversion conversion.

The frequency inverse conversion module 7 converts the smoothed frequency characteristic to a time domain. That is, the frequency inverse conversion module 7 returns the smoothed frequency characteristic to an impulse response by frequency inverse conversion. FIG. 5 is a diagram showing one example of the result of a process of returning the smoothed frequency characteristic to an impulse response by frequency inversion conversion. The impulse response shown in FIG. 5 is an impulse response after the smoothing process.

The frequency inverse conversion module 7 derives complex conjugates up to a Nyquist frequency of the smoothed frequency characteristic to generate an aliasing component after the Nyquist frequency and thus performs the frequency inverse conversion.

Figure 6:
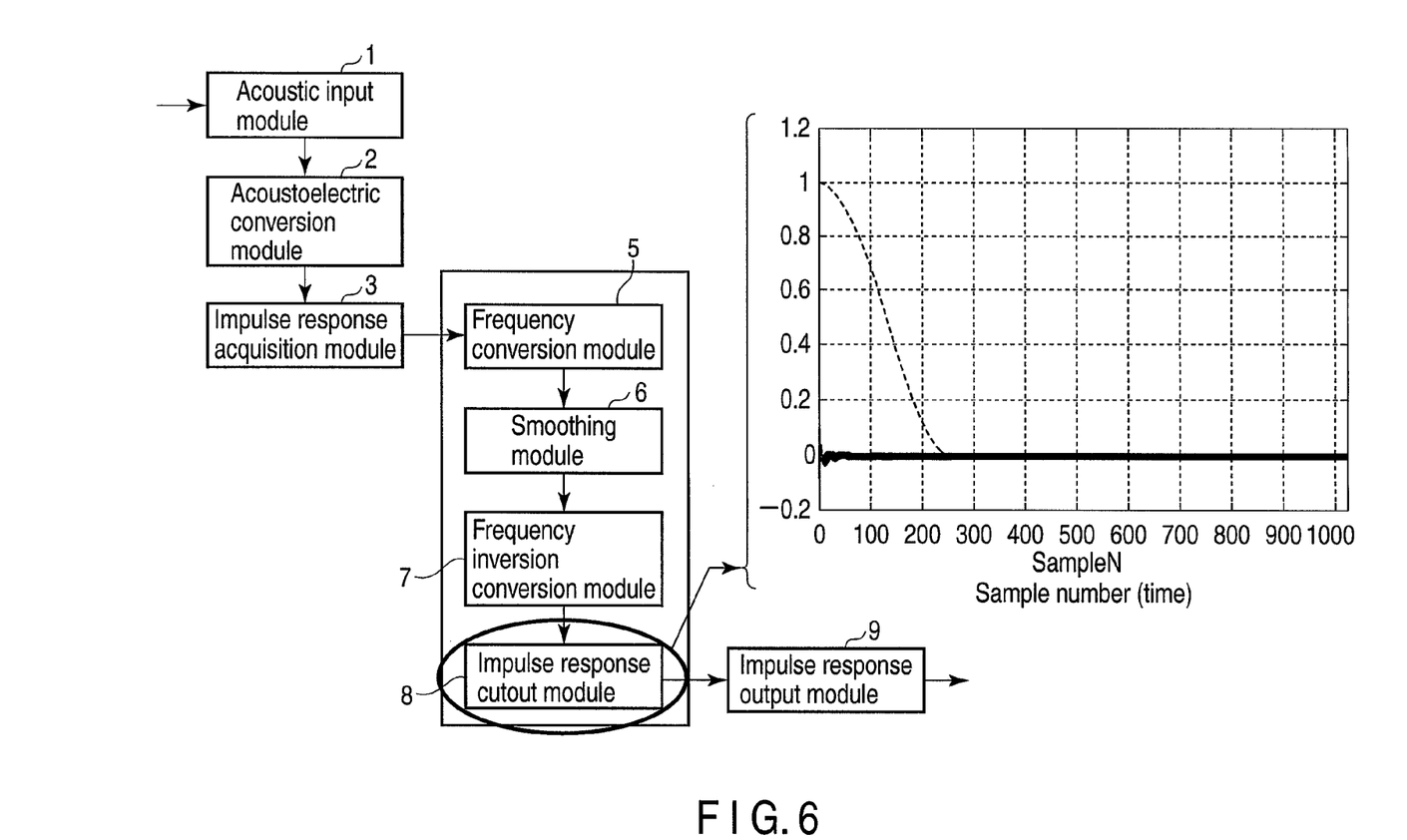
FIG. 6 is a diagram showing one example of cutting out the impulse response by a preset tap number.

The impulse response cutout module 8 cuts out an impulse response obtained by inversely converting the smoothed frequency characteristic by a preset tap number (for example, 256 taps or 128 taps). FIG. 6 is a diagram showing one example of cutting out the impulse response by a preset tap number. The impulse response output module 9 calculates and outputs a target acoustic characteristic correction coefficient based on the cutout result and incorporates the acoustic characteristic correction coefficient in the acoustic apparatus 10 such as a digital TV.

The impulse response obtained by the impulse response acquisition module 3 (that is, the impulse response before the smoothing process) is cut out into 1024 taps, but is cut off on the way without being sufficiently converged. Thus, when the impulse response before the smoothing process is cut out by a tap number limited by a window function, the cutout result may correspond to an impulse response that is not sufficiently converged in some cases. That is, an acoustic characteristic correction coefficient calculated based on the cutout result corresponding to an impulse response that is not sufficiently converged may not become an adequate correction coefficient. If the impulse response before the smoothing process is cut out by a large tap number (for example, 4096 taps or 8192 taps) by use of a window function or the like, the cutout result will correspond to an impulse response that is relatively sufficiently converged. However, if an attempt is made to increase the number of taps, the cost of the whole system will increase.

On the other hand, as shown in FIG. 5, the impulse response after the smoothing process is converged in a relatively short time in comparison with the impulse response before the smoothing process. When the impulse response after smoothing process is cut out by a preset tap number by use of the window function or the like, the cutout result (FIG. 6) comes to correspond to an impulse response that is sufficiently converged and the cutout result becomes highly precise. That is, an acoustic characteristic correction coefficient calculated based on the cutout result corresponding to the impulse response that is sufficiently converged becomes an adequate correction coefficient that contains less errors. Further, the cost of the whole system described above will not increase.

Next, the smoothing process is explained in detail. First, the smoothing module 6 performs a smoothing process for the frequency characteristic of the acquired impulse response up to a Nyquist frequency. If the frequency characteristic of the acquired impulse response is set to H(n) and the frequency characteristic after the smoothing process is set to Y(n), Y(n) is expressed by the following equation 1.

$$Y(n) = \sum_{i=-n/A}^{i=n/A} H(i)/n, \quad (0 \le n \le N/2) \quad \text{equation (1)}$$

In equation 1, A=2a (a is an octave) and N indicates the number of taps.

Next, complex conjugates of Y(n) subjected to the smoothing process by use of equation 1 are derived and an aliasing component after the Nyquist frequency is created as shown in the following equation 2.

$$Y(n) = \overline{Y(n)}, (N/2 < n \le N) \quad \text{equation (2)}$$

An impulse response subjected to the smoothing process can be calculated by applying inverse transfer to Y(n) calculated by use of equations 1 and 2.

FIG. 4 is a diagram showing one example of the result of performing a smoothing process with 1/12 of an octave (a=1/12). As shown in FIG. 4, occurrence of extreme peaks and dips can be prevented by smoothing the frequency characteristic. As a result, the sound quality will not be influenced even in a position deviated from the measurement point.

Figure 7:
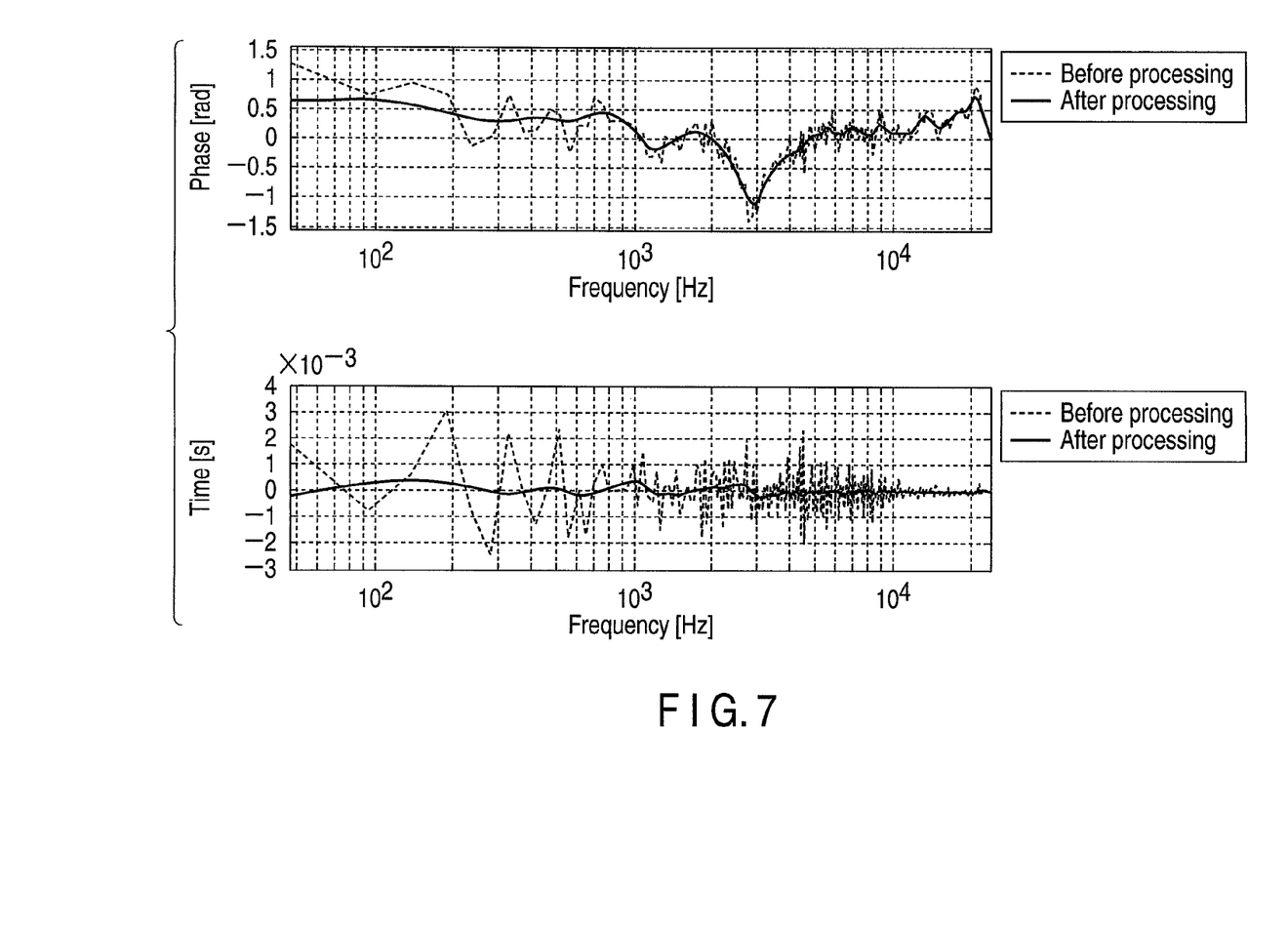
FIG. 7 is a diagram showing one example of a group delay characteristic before the smoothing process (the smoothing process is not yet applied) and after the smoothing process (the smoothing process is applied)

FIG. 7 is a diagram showing one example of a group delay characteristic before the smoothing process (the smoothing process is not yet applied) and after the smoothing process (the smoothing process is applied). When the smoothing process is not yet applied, the group delay characteristic may be extremely changed at frequencies that are close to each other and it becomes unnatural if the condition is different from the measurement condition. For example, a difference of approximately 2 ms occurs at a frequency near 1.5 kHz and a difference of 3 wavelengths may occur at approximately 1.5 kHz in some cases. On the other hand, when the smoothing process is applied, an extreme change in the group delay characteristic may be reduced.

Second Embodiment

Figure 8:
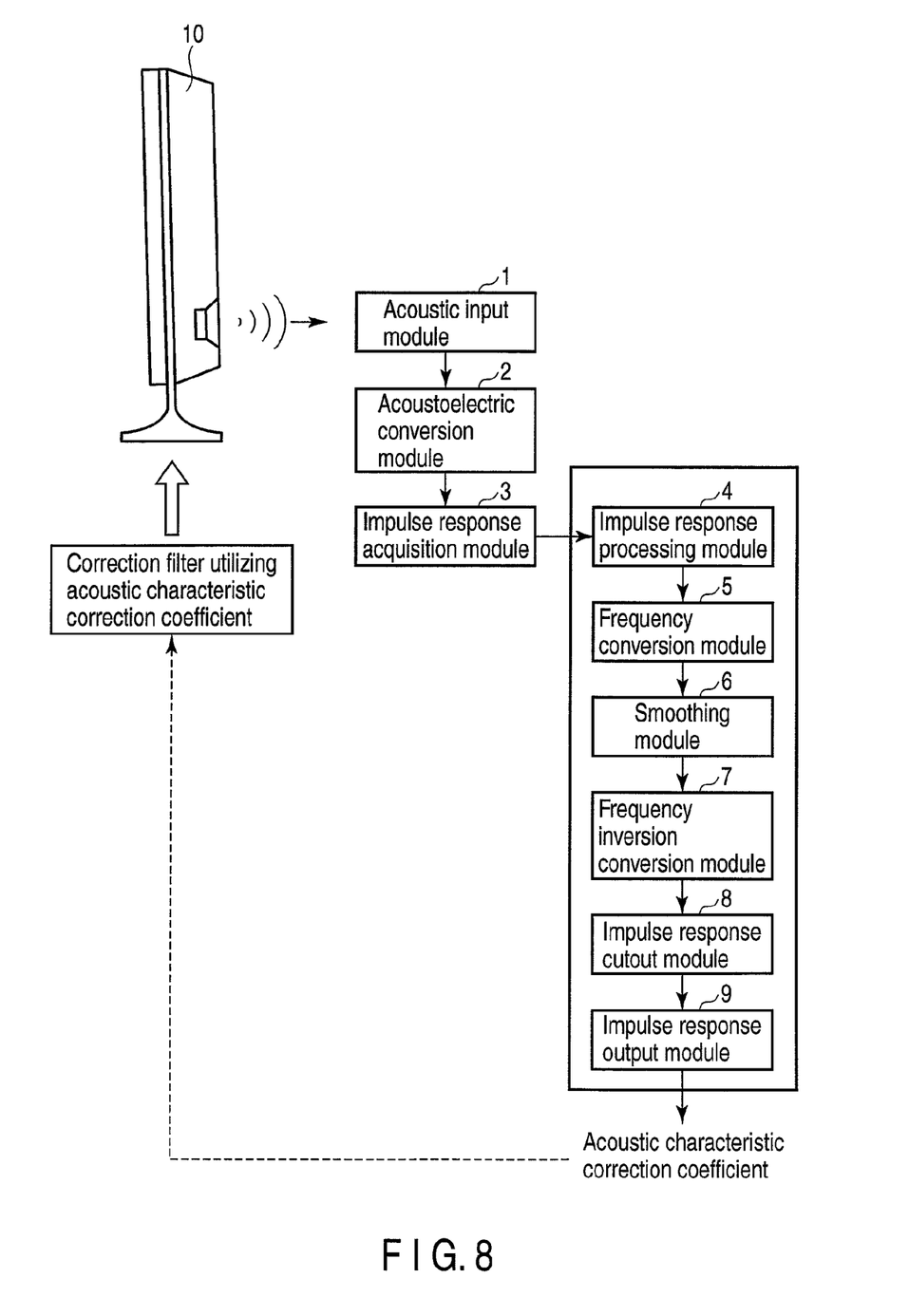
FIG. 8 is a block diagram showing one example of an acoustic characteristic correction coefficient calculation system of a second embodiment.

FIG. 8 is a block diagram showing one example of an acoustic characteristic correction coefficient calculation system of a second embodiment. As shown in FIG. 8, for example, the acoustic characteristic correction coefficient calculation system includes an acoustic input module 1, acoustoelectric conversion module 2, impulse response acquisition module 3, impulse response processing unit 4, frequency conversion module 5, smoothing module 6, frequency inverse conversion module 7, impulse response cutout module 8 and impulse response output module 9. The second embodiment will be explained below, but portions that are common to those portions of the first embodiment are omitted.

The main difference between the acoustic characteristic correction coefficient calculation system explained in the first embodiment and the acoustic characteristic correction coefficient calculation system explained in the second embodiment is that the acoustic characteristic correction coefficient calculation system of the second embodiment includes the impulse response processing unit 4.

The impulse response processing unit 4 can converge an impulse response in a preset condition to zero by use of a window function or the like. The impulse response in the preset condition is an impulse response that is not converged in a preset period of time corresponding to a preset tap number previously set by use of the impulse response acquisition module 3. As a result, the acoustic characteristic correction coefficient calculation system of the second embodiment converges an impulse response to zero when the impulse response in the preset condition is acquired, then performs the smoothing process in a frequency domain and can calculate an adequate acoustic characteristic correction coefficient.

The acoustic characteristic correction coefficient calculation algorithms of the acoustic characteristic correction coefficient calculation systems of the first and second embodiments have respective advantages and the acoustic characteristic correction coefficient calculation system according to the first or second embodiment can be applied according to various conditions/states.

As described above, the acoustic characteristic correction coefficient calculation systems of the first and second embodiments each derive a transfer function of a portion ranging from the speaker to the acoustoelectric conversion module 2, then derive an inverse transfer function of the above transfer function and perform the smoothing process of the frequency domain. Alternatively, the acoustic characteristic correction coefficient calculation systems of the first and second embodiments can each convert the above transfer function to a frequency domain, derive an inverse transfer function after performing the smoothing process of the frequency domain and calculate an acoustic characteristic correction coefficient based on the inverse transfer function.

As described above, the acoustic characteristic correction coefficient calculation systems of the first and second embodiments can prevent occurrence of extreme peaks and dips in the frequency domain and correct all of the bands to become smooth. Therefore, an uncomfortable feeling can be reduced in a place other than the measurement point. Further, robustness with respect to a variation in the speaker characteristics can be enhanced. In addition, since the impulse response can be rapidly converged, a high-quality correction filter with a less number of taps (low cost) can be formed.

Figure 9:
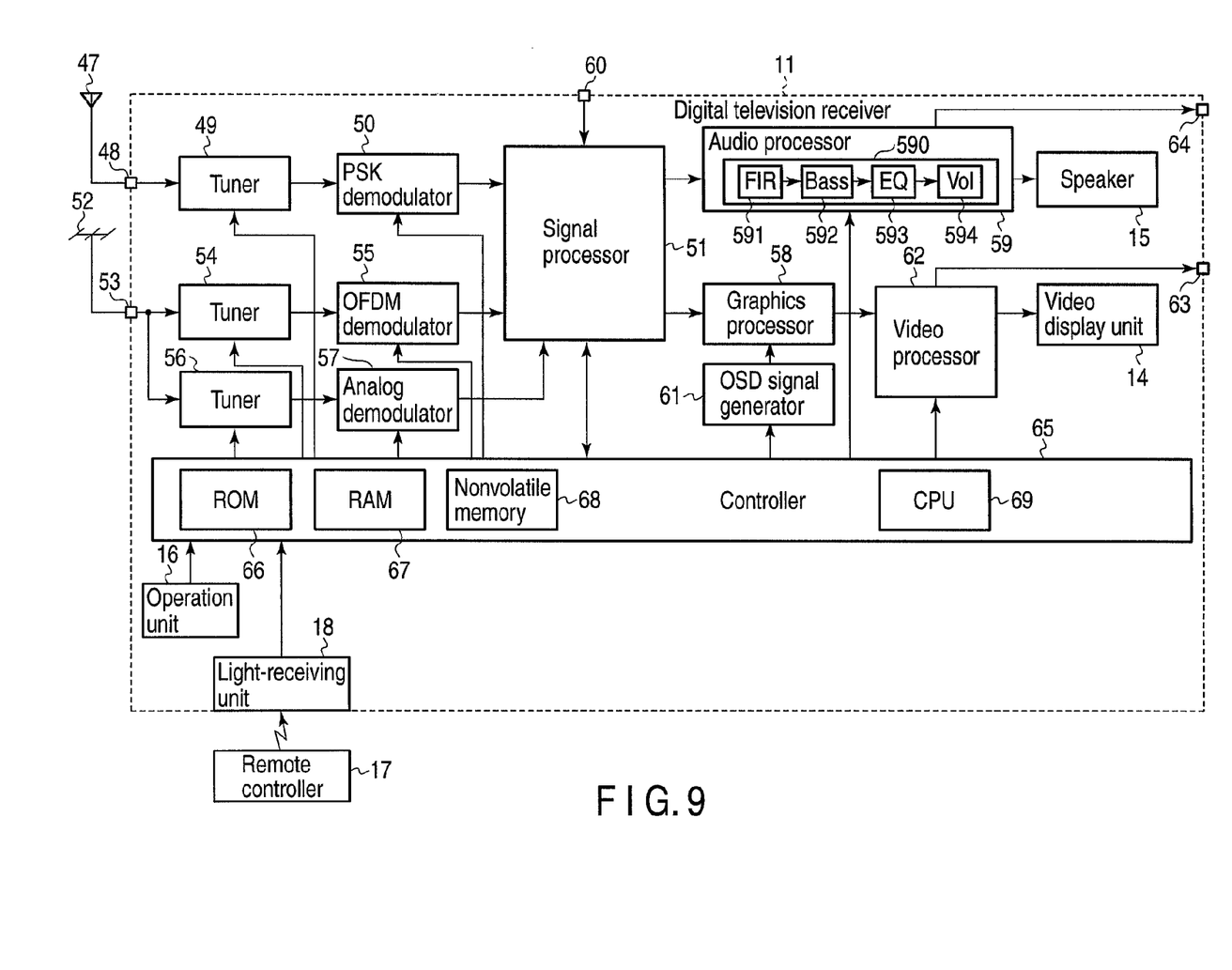
FIG. 9 is a diagram showing one example of an acoustic apparatus (acoustic characteristic correction apparatus) utilizing an acoustic characteristic correction coefficient.

Next, one example of an acoustic apparatus utilizing an acoustic characteristic correction coefficient calculated by the acoustic characteristic correction coefficient calculation system of the first or second embodiment is explained. FIG. 9 is a diagram showing one example of an acoustic apparatus (acoustic characteristic correction apparatus) utilizing an acoustic characteristic correction coefficient.

A digital television receiver 11 that is one example of the acoustic apparatus includes a video display unit 14, speaker 15, operation unit 16, light-receiving unit 18, broadcast signal input terminals 48, 53, analog signal input terminal 60, output terminals 63, 64, tuners 49, 54, 56, PSK demodulator 50, OFDM demodulator 55, analog demodulator 57, signal processor 51, audio processor 59, graphics processor 58, video processor 62, OSD signal generator 61, controller 65 and the like.

The audio processor 59 includes a correction processing unit 590 that corrects an acoustic characteristic. The correction processing unit 590 is configured to include a correction filter (FIR) 591, low-volume audio processing unit (Base) 592, equalizer (EQ) 593, volume processing unit (Vol) 594 and the like. The correction filter 591 corrects the acoustic characteristic based on the acoustic characteristic correction coefficient calculated by the acoustic characteristic correction coefficient calculation system of the first or second embodiment. The low-volume audio processing unit 592 corrects (for example, emphasizes) a low-volume audio region according to a low-volume audio setting. The equalizer 593 makes the frequency characteristic of an audio signal flat. The volume processing unit 594 adjusts volume according to a volume setting. Next, respective portions of the acoustic apparatus (digital television receiver 11) are explained.

Further, a digital DBS receiving antenna 47 and terrestrial broadcast receiving antenna 52 are respectively connected to the broadcast signal input terminals 48 and 53. The light-receiving unit 18 receives a signal output from a remote controller 17.

The controller 65 controls the operations of the respective portions of the digital television receiver 11. The controller 65 includes a CPU 69, ROM 66, RAM 67 and nonvolatile memory 68. The ROM 68 stores control programs executed by the CPU 69. The nonvolatile memory 68 stores various setting information items and control information items. The CPU 69 loads data and instruction groups required for performing processes to the RAM 67 and performs the processes.

Operation information generated by the operation unit 16 or operation information output from the remote controller 17 and received by the light-receiving unit 18 are input to the controller 65. The controller 65 performs the control operation for the respective portions by reflecting the operation content thereon.

The digital DBS receiving antenna 47 receives a satellite digital television broadcast signal. The digital DBS receiving antenna 47 outputs the received satellite digital television broadcast signal to the satellite digital broadcast tuner 49 via the input terminal 48. The tuner 49 selects a broadcast signal of a channel selected by the user from the above broadcast signal. The tuner 49 outputs the selected broadcast signal to the phase shift keying (PSK) demodulator 50. The PSK demodulator 50 demodulates the broadcast signal selected by the tuner 49 to a digital video signal and audio signal. The PSK demodulator 50 outputs the demodulated digital video signal and audio signal to the signal processor 51.

The terrestrial broadcast receiving antenna 52 receives a terrestrial digital television signal and terrestrial analog television signal. The terrestrial broadcast receiving antenna 52 outputs the terrestrial digital television signal to the tuner 54 via the input terminal 53. The tuner 54 selects a broadcast signal of a channel selected by the user from the above broadcast signal. The tuner 54 outputs the selected broadcast signal to the orthogonal frequency division multiplexing (OFDM) demodulator 55. The OFDM demodulator 55 demodulates the broadcast signal selected by the tuner 54 to a digital video signal and audio signal. The OFDM demodulator 55 outputs the demodulated digital video signal and audio signal to the signal processor 51.

Further, the terrestrial broadcast receiving antenna 52 outputs the terrestrial analog television signal to the terrestrial analog broadcast tuner 56 via the input terminal 53. The tuner 56 selects a broadcast signal of a channel selected by the user from the above broadcast signal. The tuner 56 outputs the selected broadcast signal to the analog demodulator 57. The analog demodulator 57 demodulates the broadcast signal selected by the tuner 56 to an analog video signal and audio signal. The analog demodulator 57 outputs the demodulated analog video signal and audio signal to the signal processor 51.

Further, the input terminal 60 is connected to the signal processor 51. The input terminal 60 is also used as a terminal used to input an analog video signal and audio signal from the exterior to the digital television receiver 11. The signal processor 51 respectively converts an analog video signal and audio signal input via the analog demodulator 57 or input terminal 60 to a digital video signal and audio signal.

The signal processor 51 subjects the thus converted digital video signal and audio signal and the digital video signal and audio signal input from the PSK demodulator 50 or OFDM demodulator 55 to a preset digital signal processing operation. The signal processor 51 outputs the digital video signal and audio signal subjected to the preset digital signal processing operation to the graphics processor 58 and audio processor 59.

The graphics processor 58 superimposes an on-screen display (OSD) signal such as a menu generated by the OSD signal generator 61 on the digital video signal output from the signal processor 51. The graphics processor 58 outputs the video signal having the OSD signal superimposed thereon to the video processor 62. Further, the graphics processor 58 may selectively output the video signal that is an output of the signal processor 51 and the OSD signal that is an output of the OSD signal generator 61.

The video processor 62 converts an input digital video signal to an analog video signal that can be displayed on the video display unit 14. The video processor 62 outputs the analog video signal to the video display unit 14. The video display unit 14 displays video based on the input analog video signal. The video processor 62 may further lead the analog video signal to the exterior via the output terminal 63.

The audio processor 59 converts an input digital audio signal to an analog audio signal that can be played back by use of the speaker 15. The audio processor 59 outputs the analog audio signal to the speaker 15. The speaker 15 reproduces audio based on the input analog audio signal. The audio processor 59 may further lead the analog audio signal to the exterior via the output terminal 64. As described above, the audio processor 59 includes a correction processing unit 59a and the audio processor 59 corrects the acoustic characteristic by use of a correction filter or the like that configures the correction processing unit 59a and outputs the corrected analog audio signal to the speaker 15 or the like.

Each of the acoustic characteristic correction coefficient calculation systems of the first and second embodiments explained above is a system that makes an acoustic correction by use of the inverse transfer function of the transverse function measured on a real space, converts an impulse response indicating the inverse transfer function to a frequency domain, smoothes the amplitude and phase on a frequency axis, inversely converts the smoothed frequency characteristic and calculates a correction coefficient used to correct the acoustic characteristic based on the frequency inverse conversion result. The impulse response after the smoothing process is converged in a relatively short time in comparison with the impulse response before the smoothing process. When the impulse response after smoothing process is cut out by a preset tap number by use of the window function or the like, the cutout result (FIG. 6) comes to correspond to an impulse response that is sufficiently converged and the cutout result becomes highly precise. That is, an acoustic characteristic correction coefficient calculated based on the cutout result corresponding to the impulse response that is sufficiently converged becomes an adequate correction coefficient. Further, the cost of the whole system will not increase.

Each of the acoustic characteristic correction coefficient calculation systems of the first and second embodiments can smooth only the amplitude on the frequency axis, inversely convert the smoothed frequency characteristic and calculate a correction coefficient used to correct the acoustic characteristic based on the frequency inverse conversion result. Even in this case, the impulse response after the amplitude smoothing process is converged in a relatively short time in comparison with the impulse response before the amplitude smoothing process. When the impulse response after the amplitude smoothing process is cut out by a preset tap number by use of the window function or the like, the cutout result comes to correspond to an impulse response that is converged and the cutout result becomes highly precise. That is, an acoustic characteristic correction coefficient calculated based on the cutout result corresponding to the impulse response that is converged becomes a relatively adequate correction coefficient. Further, the cost of the whole system will not increase.

The acoustic apparatus (digital television receiver 11) includes a correction filter used to correct the acoustic characteristic based on the acoustic characteristic correction coefficient calculated by the acoustic characteristic correction coefficient calculation systems of the first and second embodiments. As a result, an adequate acoustic correction can be made.

The various modules of the embodiments described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An acoustic characteristic correction coefficient calculation apparatus comprising:
a frequency converter configured to convert a first impulse response associated with an input acoustic signal to a frequency domain to obtain a frequency response, wherein the input acoustic signal is associated with a to-be-measured acoustic output unit,
a smoother configured to smooth an amplitude and a phase of the frequency response to obtain a smoothed frequency characteristic associated with the frequency response, a frequency inverter configured to invert the smoothed frequency characteristic to a time domain to obtain a second impulse response, a cutter configured to cut out the second impulse response by a preset tap number to obtain a cut out impulse response, and a calculator configured to calculate a correction coefficient to correct an acoustic characteristic associated with the to-be-measured acoustic output unit, wherein the correction coefficient is based on the cutout impulse response, wherein the smoother is configured to make the amplitudes and the phases equal in a preset frequency band having an object frequency set at a center of several frequencies sampled, and wherein the frequency inverter is further configured to derive complex conjugates up to a Nyquist frequency of the smoothed frequency characteristic to determine an aliasing component.

2. The apparatus of claim 1, wherein the first impulse response is based on one of a transfer function and an inverse transfer function, and wherein the transfer function and the inverse transfer function are based on the relation between the acoustic signal from the to-be-measured acoustic output unit and an electrical signal associated with the acoustic signal from an acoustoelectrical conversion module.

3. The apparatus of claim 1, wherein the frequency band ranges from a frequency obtained by dividing the object frequency by a desired ratio to a frequency obtained by multiplying the frequency by the desired ratio.

4. An acoustic characteristic correction apparatus comprising: a correction module configured to correct an acoustic characteristic based on a correction coefficient calculated by the apparatus of claim 1.

5. An acoustic characteristic correction coefficient calculation method comprising:

converting a first impulse response associated with an input acoustic signal to a frequency domain to obtain a frequency response, wherein the input acoustic signal is associated with a to-be-measured acoustic output unit, smoothing an amplitude and a phase of the frequency response to obtain a smoothed frequency characteristic associated with the frequency response, converting the smoothed frequency characteristic to a time domain to obtain a second impulse response, cutting out the second impulse response by a preset tap number to obtain a cutout impulse response, calculating a correction coefficient to correct an acoustic characteristic associated with the to-be-measured acoustic output unit, wherein the correction coefficient is based on the cutout impulse response, and deriving complex conjugates up to a Nyquist frequency of the smoothed frequency characteristic to determine an aliasing component.

6. The method of claim 5, wherein the first impulse response is based on a transfer function and wherein the transfer function is based on the relation between the acoustic signal from the to-be-measured acoustic output unit and an electrical signal associated with the acoustic signal from an acoustoelectrical conversion module.

7. The method of claim 5, further comprising calculating the correction coefficient based on an inverse transfer function of a transfer function associated with the cutout impulse response.

8. The method of claim 6, further comprising calculating the correction coefficient based on an inverse transfer function of a transfer function associated with the cutout impulse response.

9. The method of claim 5, wherein the first impulse response is based on an inverse transfer function associated with a transfer function and wherein the transfer function is based on the relation between the acoustic signal from the to-be-measured acoustic output unit and an electrical signal associated with the acoustic signal from an acoustoelectrical conversion module.

* * * * *